June 28, 1966   A. KÜCKENS   3,258,166
DISPENSER FOR LIQUIDS
Filed Nov. 17, 1964
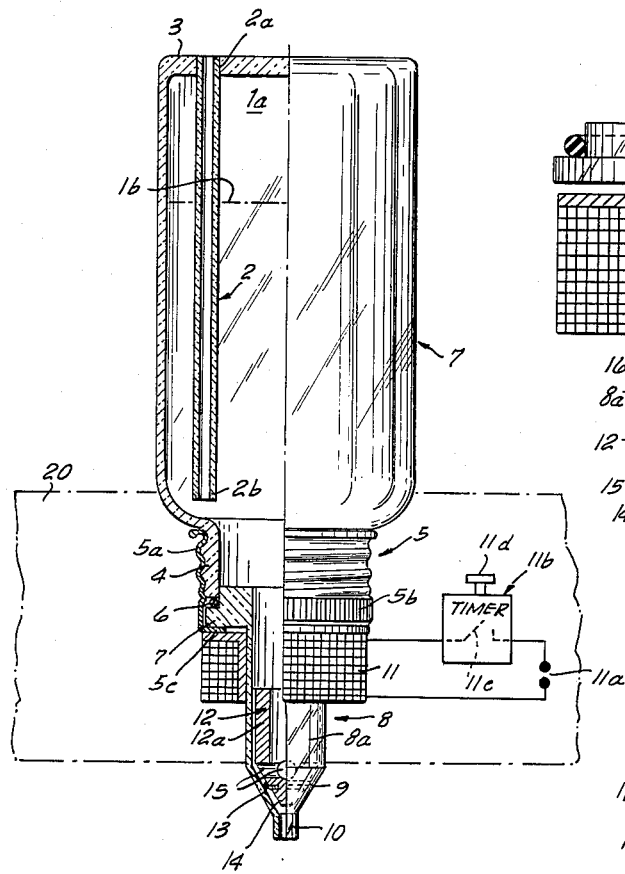
FIG. 1
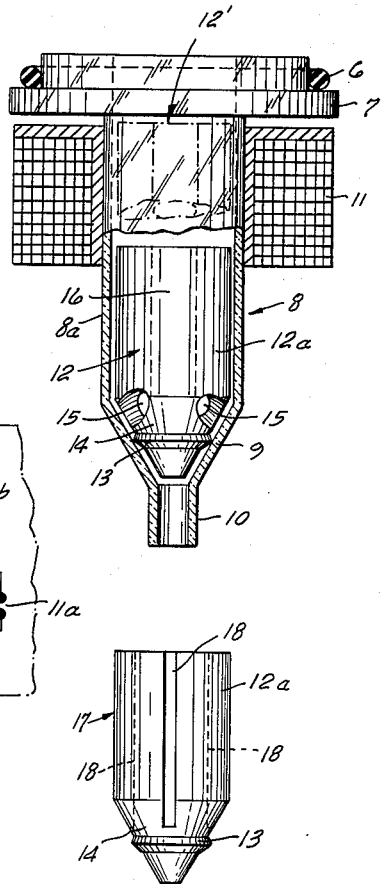
FIG. 2
FIG. 3
INVENTOR
ALEXANDER KÜCKENS
BY *Michael S. Striker*
his ATTORNEY

United States Patent Office 3,258,166
Patented June 28, 1966

3,258,166
DISPENSER FOR LIQUIDS
Alexander Kückens, Hamburg, Germany, assignor to Dagma G.m.b.H. & Co., Hamburg, Germany
Filed Nov. 17, 1964, Ser. No. 411,789
Claims priority, application Germany, Nov. 19, 1963, D 42,976
7 Claims. (Cl. 222—70)

The present invention relates to dispensers in general, and more particularly to a dispenser for liquids. Still more particularly, the invention relates to improvements in dispensers of the type wherein measured or unmeasured quantities of a liquid medium are dispensed in response to energization of an electromagnetic discharging device.

It is an important object of the present invention to provide a dispenser for liquids which is constructed and assembled in such a way that it may discharge predetermined or unmeasured quantities of a liquid medium directly from its storage tank so that, when the liquid medium is measured, it is dispensed directly from the tank proper instead of passing through a calibrated chamber as in many conventional dispensers of which I am aware at this time.

Another object of the invention is to provide a dispenser which will discharge seriatim identical quantities of a liquid medium regardless of the height of the liquid column in its tank.

A further object of the invention is to provide a dispenser which may be readily taken apart to allow for cleaning or inspection of its parts, wherein such dismantling requires little time and may be carried out without resorting to any tools, wherein a single manipulation suffices to expose all such parts which require refilling or cleaning, and which may be reassembled with equal facility by persons having little technical skill.

An additional object of the instant invention is to provide a dispenser which is particularly suited for use in automats, which comprises a minimum of parts, which is of very simple construction, which may be furnished in any desired size or shape, and which may be readily adjusted to discharge a desired quantity of a liquid medium at a time.

A concomitant object of the invention is to provide a novel electromagnetic discharging device for use in a dispenser of the above outlined characteristics.

Another object of the invention is to provide an improved valve for the improved dispenser.

A further object of the invention is to provide a dispenser which can discharge accurately measured quantities of a liquid medium in rapid sequence, which is automatically sealed when not in use, and whose space requirements are determined almost exclusively by the dimensions of its tanks because all other components occupy very little room.

Another object of the invention is to provide a dispenser which can discharge liquid at a rate faster than gravity flow.

Briefly stated, one feature of my invention resides in the provision of a dispenser for liquids which comprises a liquid-containing receptacle or tank having a lower end portion provided with an outlet defining a valve seat, an electromagnetic device for discharging metered quantities of liquid from the tank and including an armature in the form of a valve member which is in sealing engagement with the valve seat when the coil of the electromagnetic device is deenergized but rises above the valve seat to permit escape of liquid when the coil is energized, and a vent tube extending into the tank and having an open end which is immersed in the liquid when the tank is at least partially filled so that the interior of the tank above the liquid level is sealed from the atmosphere.

The armature is free to reciprocate in the outlet and descends by gravity to engage the valve seat when the coil is deenergized. When the coil is energized, the armature rises and begins to oscillate at a gradually decreasing amplitude to come to rest in a neutral position in which it remains spaced from the valve seat until the coil is deenergized. While it oscillates, the armature acts not unlike a plunger and expels liquid through the outlet. The duration of the interval during which the coil of the electromagnetic device remains energized is preferably controlled by a suitable timer device so that the dispenser will discharge seriatim equal quantities of liquid in response to repeated energization of the coil.

The novel features which are considered as characteristic of the invention are set forth in particular in the appended claims. The improved dispenser itself, however, both as to its construction and the mode of manipulating the same, together with additional features and advantages thereof, will be best understood upon perusal of the following detailed description of certain specific embodiments with reference to the accompanying drawings, in which:

FIG. 1 is a partial side elevational and partial axial sectional view of a fully assembled dispenser which is constructed in accordance with a first embodiment of my invention;

FIG. 2 is an enlarged axial section through the lower part of the dispenser; and FIG. 3 is a side elevational view of a modified armature which may be utilized in the dispenser of FIG. 1.

Referring to the drawings, and first to FIG. 1, the dispenser comprises a liquid-receiving tank 1 which may consist of transparent or translucent vitreous or synthetic plastic material and resembles an inverted bottle. This bottle may contain a supply of coffee concentrate or another beverage which will be dispensed in return for insertion of a coin or in response to manipulation of its discharging device by an operator in an automaton, restaurant, luncheonette or a similar establishment. The top wall 3 of the tank 1 (which is actually the bottom wall because the tank is mounted in inverted position) carries the upper end portion 2a of a vent tube 2 which extends all the way to the upper end of the lower end portion or neck 4 and is mounted laterally of the vertical axis of the tank, i.e., in such a way that its open inner end portion 2b is not in the path of the liquid stream when the tank 1 is inverted to normal position and is refilled through the neck 4. Thus, the internal space 1a of the tank 1 above the liquid level 1b (indicated by a phantom line) is sealed from the atmosphere, as long as the tank is at least partially filled, even though the upper end portion 2a of the vent tube 2 is open.

The neck 4 is provided with external threads which mesh with the threads of a coupling nut 5. This nut resembles a cap and comprises a threaded portion 5a at its upper end (as viewed in FIG. 1), a knurled handgrip portion 5b at its lower end, and an annular retaining flange 5c which extends inwardly from the knurled portion 5b. The flange 5c overlies the underside of an annular collar 7 provided at the upper end of a tubular outlet 8 which consists of vitreous or synthetic plastic material and extends downwardly to terminate in a downwardly converging conical valve seat 9 having a cylindrical nipple 10. The lower portion of the collar 7 overlies the end face of the neck 4 and compresses an annular gasket 6 of rubber or the like to prevent leakage of liquid from the internal space of the tank 1. The valve seat 9 and its nipple 10 together form a funnel-shaped unit which is located immediately below the cylindrical portion 8a of the outlet 8.

The outlet 8 cooperates with an electromagnetic discharging device including a cylindrical coil 11 surrounding the cylindrical portion 8a and a vertically reciprocable armature or valve member 12. The armature 12 comprises a cylindrical upper portion 12a which is provided with an axially extending blind bore 16 communicating with the interior of the tank 1 and a conical lower portion 14 having at least one but preferably two or more outwardly and downwardly inclined bores 15. The bores 15 communicate with the lower end of the bore 16 so that a liquid contained in the tank 1 normally fills the bores 16, 15 and descends to the level of a sealing ring 13 which is provided on the periphery of the conical portion 14 and normally abuts against the internal surface of the valve seat 9. When the coil 11 is deenergized, the armature 12 remains in the solid-line position of FIG. 2 and its sealing ring 13 cooperates with the valve seat 9 to prevent escape of liquid from the tank 1. When the condition of energization of the coil 11 is changed, i.e., when the coil is energized, it attracts the armature 12 whereby the latter rises to and beyond the phantom-line position 12' shown in FIG. 2 and allows some liquid to escape through the nipple 10 and into a cup or the like, not shown. The armature 12 is snugly received in the cylindrical portion 8a of the outlet 8 but is free to slide therein with a minimum of friction. It is clear that the annular coil 11 may be replaced by a U-shaped or otherwise configurated coil.

The dispenser of FIGS. 1 and 2 is operated as follows:

If the tank 1 is empty, the entire dispenser is inverted so that the neck 4 faces upwardly and the nut 5 is then detached so that the open end of the neck is fully exposed whereby the operator is in a position to introduce a fresh supply of coffee or another liquid up to the level of the inner end portion 2b of the vent tube 2. Once the nut 5 is detached from the neck 4, it may be separated from the outlet 8 and the armature 12 may be slipped out of the outlet to facilitate cleaning. Thus, merely by removing the nut 5, the operator is in a position to clean or to refill the tank 1, to clean the armature 12, to clean the outlet 8 and, if necessary to replace the gasket 6.

Once the tank 1 is filled with a fresh supply of hot or cold liquid, the nut 5 is screwed onto the neck 4 to fix the gasket 6 and the outlet 8 in requisite position (the armature 12 is assumed to be accommodated in the cylindrical portion 8a), and the tank is thereupon inverted to take the position shown in FIG. 1. In such position, the tank is placed onto or into a suitable bracket 20 or another support. As soon as the tank 1 is reinverted to take the position of FIG. 1 or 2, the armature 12 descends by gravity and its ring 13 moves in sealing engagement with the valve seat 9 to prevent uncontrolled escape of liquid. However, the liquid is free to fill the bores 15, 16 and the clearance (if any) between the armature 12 and outlet 8 at a level above the sealing ring 13. It is to be noted here that the ring 13 constitutes an optional feature of the armature 12 since the conical portion 14 may move in direct sealing engagement with the internal surface of the valve seat 9 if the ring 13 is omitted.

The coil 11 is connected in circuit with a source 11a of electrical energy and with an electric timer 11b having a normally open switch 11c which may be closed by a handle 11d or in response to insertion of a coin to complete the circuit of the coil 11 for a predetermined interval of time, such as is necessary to discharge a desired unit quantity of liquid from the tank 1. When the coil 11 is energized, it attracts the armature 12 so that the latter rises first to the phantom-line position 12'. However, its inertia carries the armature 12 beyond the phantom-line position 12' but, once it reaches a position of maximum elevation, the armature descends by gravity and in response to magnetic attraction back into the magnetic field of the coil 11 which lifts it again to a level somewhat below the maximum level and the armature descends again. Thus, the armature begins to oscillate at a high frequency by moving up and down, but the amplitude of oscillations decreases until the armature comes to rest in a neutral position corresponding to the position 12'. The armature then remains in such neutral position 12' as long as the circuit of the coil 11 remains completed. Once the coil is deenergized, the armature 12 descends by gravity and returns to the solid-line position of FIG. 1 or 2 to seal the valve seat 9. The armature 12 preferably consists of steel or another suitable magnetizable material.

It will be noted that movements of the armature 12 upwardly and beyond the phantom-line neutral position 12' are limited solely by the column of liquid in the tank 1. Of course, the length of the armature 12 and the length of the outlet 8 will be selected in such a way that at least the lower end portion of the armature remains in the cylindrical portion 8a even at the time when the armature is suddenly lifted from the valve seat 9 in response to energization of the coil 11.

While it remains in raised position (i.e., while the ring 13 is lifted above the valve seat 9), the armature 9 allows the liquid to escape through the bores 16, 15 and via nipple 10. In addition, while it oscillates the armature acts not unlike the plunger of a pump and actually forces the liquid through the nipple 10. This increases the rate of outflow and is of particular advantage when the viscosity of the liquid is high, for example when the liquid is a coffee extract, a highly concentrated fruit drink, milk, hot chocolate, cocoa or the like.

In descending to its sealing position after the coil 11 is deenergized, the armature 12 is assisted by the weight of the liquid column in the tank 1 so that it rapidly descends and moves the ring 13 in sealing engagement with the valve seat 9. Since the liquid need not be dispensed through a calibrated receptacle but escapes directly from the tank 1, the dispensing of a measured quantity of liquid requires very little time. In fact, and since the armature 12 performs the function of a plunger (while it oscillates at a gradually decreasing amplitude), the evacuation of a measured quantity of liquid actually requires less time than evacuation by gravity flow alone.

The vent tube 2 insures that the electromagnetic discharging device invariably dispenses an accurately metered quantity of liquid. This tube takes care of necessary static pressure equalization in the interior of the tank 1 by allowing air to bubble into the tank when the outlet 8 discharges a stream of liquid. Thus, and since the open end portion 2b is located in the area which is close to the neck 4, static pressure equalization takes place independently of the momentary liquid level in the tank 1 and the interior of the tank above the liquid level 1a remains sealed from the atmosphere. In this respect, the dispenser of my invention differentiates substantially from conventional dispensers which must be provided with a separate chamber to insure that each of a series of consecutive dispensing operations will result in discharge of equal quantities of liquid. Such separate chambers must be provided with valves which involve additional initial and maintenance cost and are prone to malfunction. The valves must be cleaned at frequent intervals, particularly if the dispenser is used in connection with viscous beverages or other types of viscous liquids. Such viscous liquids are likely to contaminate or to clog the valves. My improved dispenser will operate without additional valves and requires a single chamber, i.e., the tank 1.

If the coil 11 remains energized, the nipple 10 will continue to discharge a stream of liquid, as long as some liquid remains in the tank 1. Furthermore, and if the timer 11b is coin operated, the dispenser may be utilized practically without any interruptions because the liquid is discharged directly from the tank 1. In other words, and when used in an automat, the dispenser may be operated without interruptions and is readily refillable with little loss in time whereby the manipulation necessary to expose the open end of the neck 4 merely involves removal of the nut 5. In addition, and as stated above, by removing the nut 5 the operator will gain access to the interior of the outlet 8, to the armature 12 and to the gasket 6.

FIG. 3 illustrates a slightly modified armature 17 which again comprises a cylindrical upper portion 12a and a conical lower portion 14 having a sealing ring 13, but the cylindrical portion 12a is provided with a series of axially extending peripheral grooves or slots 18 which replace the bores 16, 15 of the armature 12. In the embodiment of FIG. 3, the armature 17 is provided with four equidistant slots 18 each of which extends from the top end face of the cylindrical portion 12a to the peripheral surface of the conical portion 14. It will be noted that the slots 18 terminate at a level slightly above the sealing ring 13.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a dispenser for liquids, a single liquid-containing tank having a lower end portion provided with a detachable outlet, said outlet having a valve seat; an electromagnetic device for discharging the liquid from said tank including a normally deenergized coil outwardly adjacent to said outlet and an armature reciprocably received in and detachable with said outlet and normally engaging said valve seat by gravity to seal said outlet, said coil being energizable to lift the armature above said valve seat so that the liquid may escape through said outlet; vent means communicating with said tank at a level located below the level of the liquid when the tank is at least partially filled and located above said outlet so as to form a constant head above said outlet the interior of the tank above the liquid level being sealed from the atmosphere; coupling means for detachably coupling said outlet to the remainder of said tank; and timer means for energizing said coil for predetermined intervals of time.

2. A structure as defined in claim 1, wherein said valve seat is of downwardly converging configuration, said armature includes a conical lower end portion normally engaging said valve seat, and said armature is provided with an axially extending blind bore in communication with the interior of said tank and at least one additional bore communicating with said blind bore and terminating at the periphery of said conical portion upwardly of the point of engagement of the latter with said valve seat, so that liquid filling said blind bore and said additional bore may escape through said outlet only when said armature is lifted by said coil.

3. A structure as set forth in claim 2, wherein said blind bore extends downwardly to the upper end of said conical portion and wherein said additional bore is inclined with reference to the axis of said outlet.

4. A structure as defined in claim 1, wherein said valve seat is of downwardly converging configuration, said armature includes a conical lower end portion normally engaging said valve seat and a cylindrical upper portion slidably received in said outlet above said valve seat, and wherein said armature is provided with at least one longitudinally extending groove in the periphery of said cylindrical portion to convey liquid to the periphery of the conical portion.

5. A structure as defined in claim 1, wherein said lower end portion of said tank is provided with a neck, and wherein said coupling means detachably couples said outlet to said neck.

6. A structure as set forth in claim 5, wherein said neck is provided with external threads and wherein said coupling means comprises a threaded nut meshing with the threads on said neck and having a portion overlying a portion of said outlet.

7. A structure as defined in claim 1, wherein said coil surrounds at least a portion of said outlet upwardly of said valve seat.

References Cited by the Examiner

UNITED STATES PATENTS

| | | | |
|---|---|---|---|
| 792,621 | 6/1905 | Schlveter et al. | 222—479 |
| 1,513,935 | 11/1924 | Schatz | 222—481.5 |
| 2,254,833 | 10/1941 | Ashkenaz | 222—504 |
| 2,526,735 | 10/1950 | Duce | 222—504 X |
| 2,551,842 | 5/1951 | Kirchner | 222—481.5 |
| 2,887,255 | 5/1959 | Baverlein | 222—504 X |
| 2,979,231 | 4/1961 | Witherspoon | 222—504 X |

FOREIGN PATENTS

| | | |
|---|---|---|
| 241,278 | 11/1962 | Australia. |
| 73,204 | 1/1894 | Germany. |
| 970,396 | 9/1964 | Great Britain. |

RAPHAEL M. LUPO, *Primary Examiner.*

HADD S. LANE, *Examiner.*